(12) United States Patent
Kasai

(10) Patent No.: US 6,914,726 B2
(45) Date of Patent: Jul. 5, 2005

(54) OPTICAL APPARATUS AND VIEWING OPTICAL SYSTEM THEREOF WHICH IS CAPABLE OF DISPLAYING INFORMATION

(75) Inventor: Ichiro Kasai, Kawachinagano (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/421,575

(22) Filed: Oct. 20, 1999

(65) Prior Publication Data

US 2003/0123114 A1 Jul. 3, 2003

(30) Foreign Application Priority Data

Oct. 20, 1998 (JP) .......................................... 10-297991

(51) Int. Cl.⁷ .............................................. G02B 27/14
(52) U.S. Cl. ......................... 359/629; 359/13; 359/15; 359/625; 359/630; 359/631; 359/632; 359/633; 359/638; 359/640; 359/900; 345/7; 345/8; 345/9
(58) Field of Search ............................ 359/13, 15, 618, 359/625, 629, 630–633, 636, 638, 640; 345/7–9

(56) References Cited

U.S. PATENT DOCUMENTS 4,027,327 A   5/1977   Harada ........................ 354/201
4,576,458 A   3/1986   Cho et al. ..................... 354/199
5,355,224 A * 10/1994  Wallace ........................ 359/631

FOREIGN PATENT DOCUMENTS

| GB | 2 123 974 A | * | 7/1982 |
| JP | 51-19530 | | 2/1976 |
| JP | 58-27504 | | 2/1983 |
| JP | 59-185319 | | 10/1984 |
| JP | 53-46508 | | 12/1993 |

* cited by examiner

Primary Examiner—Audrey Chang
Assistant Examiner—Craig Curtis
(74) Attorney, Agent, or Firm—Sidley Austin Brown & Wood LLP

(57) ABSTRACT

A viewing optical system of an optical apparatus has an objective system for forming an image of an object and an eyepiece system for enlarging and directing the image to the pupil. The viewing optical system also has a hologram combiner comprising holograms of the volume type, phase type, and reflective type and having optical power for constructing a surface which is optically equivalent to the image surface at a different position than the image when viewed from the pupil. The system also includes an information display means for displaying information at the position of the equivalent surface, wherein the hologram combiner transmits light from the image and reflects light from the information display means so as to allow viewing of an image together with the information display overlaid onto the image.

12 Claims, 7 Drawing Sheets

US 6,914,726 B2

OPTICAL APPARATUS AND VIEWING OPTICAL SYSTEM THEREOF WHICH IS CAPABLE OF DISPLAYING INFORMATION

This application is based on Application No. H10-297991 filed in Japan, the content of which is hereby incorporated by reference.

FIELD OF THE INVENTION

The present invention relates to an optical apparatus having a viewing optical system. In one aspect, the present invention relates to a viewing optical system, suitable for use as a viewfinder optical system in, for example, single lens reflex cameras, lens shutter cameras, and digital still cameras, wherein the viewfinder optical system has an information display function.

BACKGROUND OF THE INVENTION

Viewing optical systems provided with holograms are well known. A hologram may be used as a condenser lens to match the pupil of the eyepiece with the objective system (Japanese Laid-Open Patent Application No. SHO 51-19530), and also may be used as an information display. For example, the viewing optical systems disclosed in Japanese Published Patent No. 58-27504 and Japanese Laid-Open Patent Application No. 59-185319 are provided with a hologram of a pre-recorded specific display pattern, and this pre-recorded display pattern is regenerated and displayed together with a photographic subject image.

In these viewing optical systems, only the specific display pattern recorded when the hologram was generated can be displayed and optional information not recorded in the hologram cannot be displayed.

SUMMARY OF THE INVENTION

An object of the present invention is to provide an improved viewing optical system.

Another object of the present invention is to provide a viewing optical system capable of displaying optional information using a hologram.

These objects are attained by providing a viewing optical system according to the embodiments described below.

A viewing optical system according to a first embodiment of the present invention has an objective system for forming an image of an object and an eyepiece system for enlarging and directing the image to the pupil. A viewing optical system is further provided with a hologram combiner comprising holograms of the volume type, phase type, and reflective type and having optical power for constructing a surface which is optically equivalent to the image surface at a different position than the image when viewed from the pupil. The viewing optical system also includes an information display means for displaying information at the position of the equivalent surface, wherein the hologram combiner transmits light from the image and reflects light from the information display means so as to allow viewing of an image together with the information display overlaid onto the image.

In a viewing optical system according to a second embodiment of the present invention, the hologram combiner is arranged on the object side of the eyepiece system in the construction of the first embodiment.

A viewing optical system of a third embodiment provides, in the construction of the second embodiment, a Keplerian type viewing optical system in which the image is a real image, and wherein an inverting system is included to invert the image so that the object is viewed as an erect positive image. The hologram combiner is arranged within the inverting system.

A viewing optical system of a fourth embodiment provides, in the construction of the second embodiment, a hologram combiner which is a phase type hologram generated by dual light flux interference recordings, and wherein one of the preparation light fluxes is generated by an optical system identical to the eyepiece system.

BRIEF DESCRIPTION OF THE DRAWINGS

These and other objects and features of this invention will become clear from the following description taken in conjunction with the preferred embodiments with reference to the accompanying drawings, in which.

DETAILED DESCRIPTION OF THE PREFERRED EMBODIMENTS

The embodiments of the viewing optical system of the present invention are described hereinafter with reference to the accompanying drawings. Like and equivalent parts are designated by like reference numbers throughout the several drawings, and duplicate descriptions are omitted where appropriate.

Figure 1:
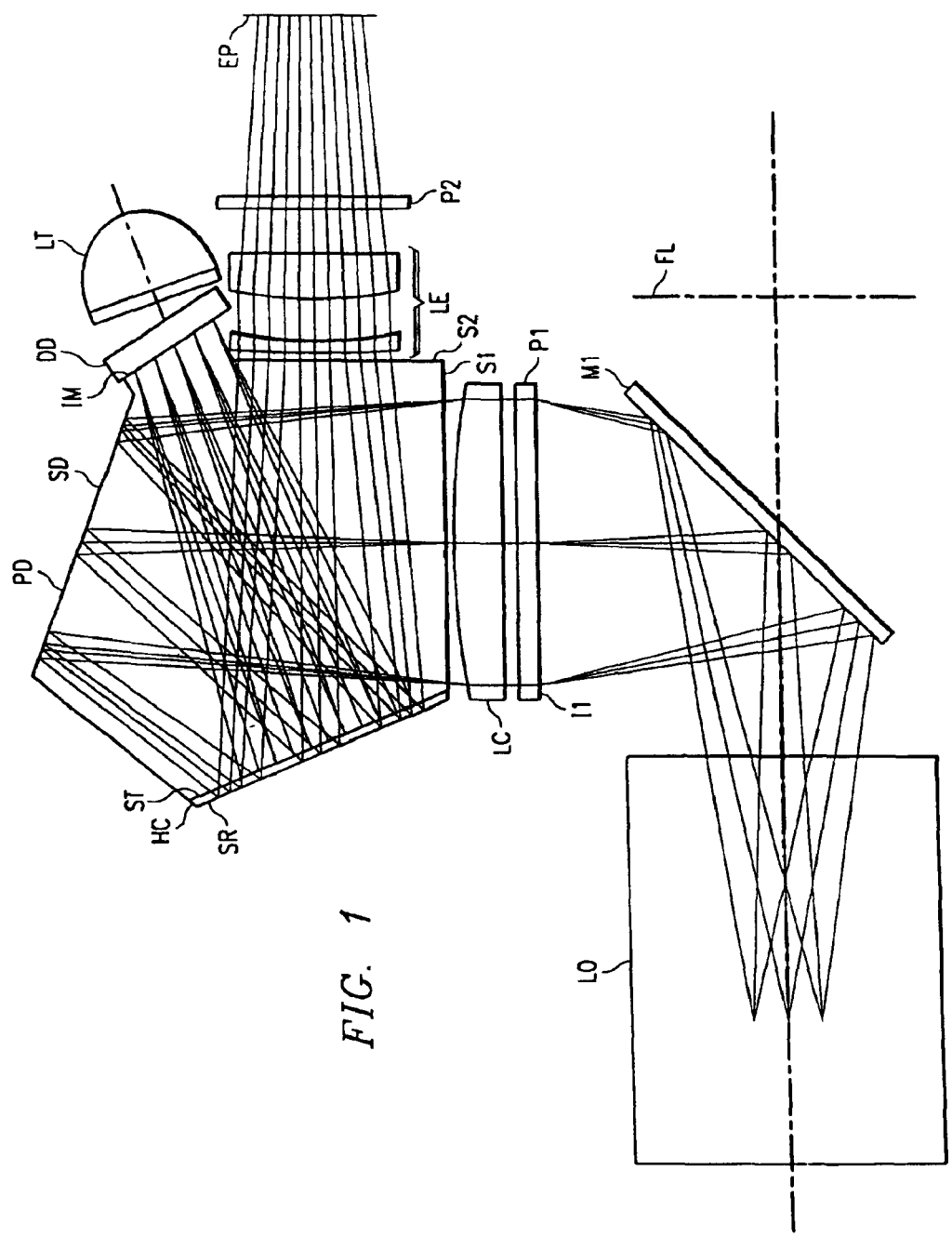
FIG. 1 is an optical structural diagram of a first embodiment of the present invention.
Figure 10:
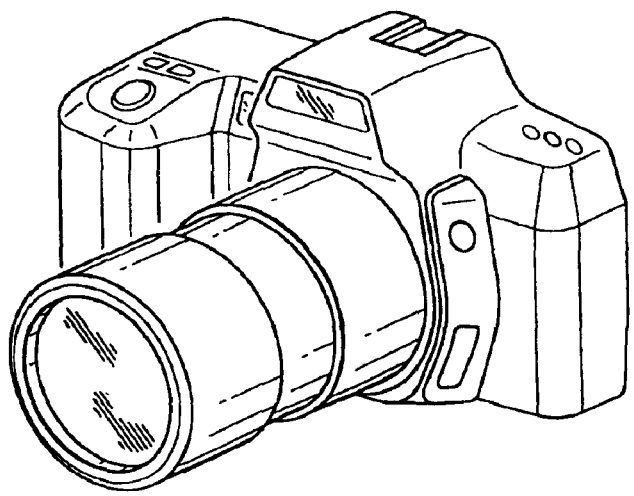
FIG. 10 is a pictorial view of a single lens reflex camera.

FIG. 1 shows the optical structure of a first embodiment of the present invention. The first embodiment is a viewfinder optical system for a single lens reflex camera, such as that shown in FIG. 10, and is provided with an objective system (LO) for forming the image of an object as an image (I1), and an eyepiece system (LE) for enlarging and directing the image of the hologram (H) to the pupil (EP). This viewfinder optical system includes the construction of a typical viewfinder optical system including an objective system (LO), a mirror (M1), a focusing screen (P1), a condenser lens (LC), a penta-roof prism (PD), an eyepiece system (LE), and a protective glass (P2), and further comprises an illumination light source (LT), a display element (DD), and a hologram combiner (HC). In the drawing, reference FL refers to a film surface.

An object image (I1) is formed on the focusing screen (P1) by the objective system (LO), and the object light emitted from the focusing screen (P1) constructs the viewfinder screen. The object light from the image (I1) is condensed by the condenser lens (LC) and enters the pentagonal prism (PD). The pentagonal prism (PD) comprises an inverting system for inverting an image so as to allow an object to be viewed as an erect positive image. After the image is inverted by the pentagonal prism (PD), the object light emitted from the pentagonal prism (PD) is transmitted through the eyepiece system (LE), the protective glass (P2), and arrives at the pupil (EP).

The pentagonal prism (PD) has a plurality of surfaces including an incidence surface (S1), a roof reflecting surface (first and second reflecting surfaces)(SD), a final reflecting surface (third reflecting surface)(SR), and an exit surface (S2), wherein the hologram combiner (HC) is arranged on the final reflecting surface (SR). That is, the surface on the front of the pentagonal prism (PD) is a transmission surface (ST), and the hologram combiner (HC) is positioned between the transmission surface (ST) and the final reflecting surface (SR). The hologram combiner (HC), which comprises volume type, phase type, and reflective type holograms, functions to transmit the object light from the image (I1) and reflect the information display light from the display surface (IM) of the display element (DD). The hologram formed by the hologram combiner (HC) is not the recording of a specific display image, but rather the hologram combiner (HC) functions as a combiner lens to overlay the information display onto the object light.

The display element (DD) and the illumination light source (LT) comprise the information display means. The display element (DD) is an optical modulation element such as a liquid crystal display (LCD), and modulates the light from the illumination light source (LT) so as to display optional information on the display surface (IM). The displayed information may include exposure related data (e.g., shutter speed, f-stop value, exposure correction value), photographic area (e.g., field frame display), distance measuring area (e.g., AF frame display), photometric area (e.g., photometric frame display), focus detection result (e.g., focused/unfocused or front focus/back focus), focus adjustment direction, flash related data, and the like. A replaceable mask also may be used at the display surface (IM) position rather than an optical modulation element such as an LCD. Furthermore, a self-emitting type display device provided with a light-emitting diode (LED) or the like may be used as the information display means.

The hologram combiner (HC) has optical power for constructing a surface which is optically equivalent to the image (I1) at a different position than the image (I1) when viewed from the pupil (EP). The display surface (IM) of the display element (DD) is positioned at an optically equivalent surface to the image (I1) as viewed from the pupil (EP). That is, the display element (DD) is arranged such that the parallel light flux from the pupil (EP) is reflected by the hologram combiner (HC) and forms an image at the position of the display surface (IM). Accordingly, the object light from the image (I1) is transmitted through the hologram combiner (HC) before and after being reflected by the reflection surface (SR), and the information display light from the display surface (IM) is reflected by the hologram combiner (HC). The light transmitted (object light) by the hologram combiner (HC) and the reflected light (information display light) both continue to the eyepiece system (LE), and the image formed by the transmitted light and the information display image formed by the reflected light are projected as virtual images at the same position via the eyepiece system (LE). That is, the information display is overlaid onto the image (I1) so as to be viewed together with the photographic object within the viewfinder field.

A hologram having a high wavelength selectability must be used in the hologram combiner (HC). When the wavelength selectability is low, the object light of wavelengths outside the wavelength of the information display are reflected by the hologram combiner (HC). For this reason a reflective type hologram is used in the hologram combiner (HC). A reflective type hologram has extremely high wavelength selectability compared to a transmission type hologram. That is, the reflective type hologram responds to specific wavelengths but does not respond to other wavelengths. Since a reflective type hologram does not respond to the wavelengths of the object light (i.e., wavelengths which are the same as those of the information display), the object light is virtually unaffected by the hologram combiner (HC). Accordingly, the image and the information display image are both bright and superbly viewable. This significant advantage is not obtainable by using a transmission type hologram.

Figure 6A:
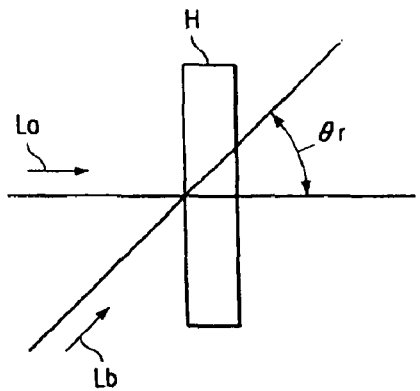
FIG. 6(A) is a schematic diagram of a relationship between preparation light and a photosensitive material when a hologram is recorded.
Figure 6B:
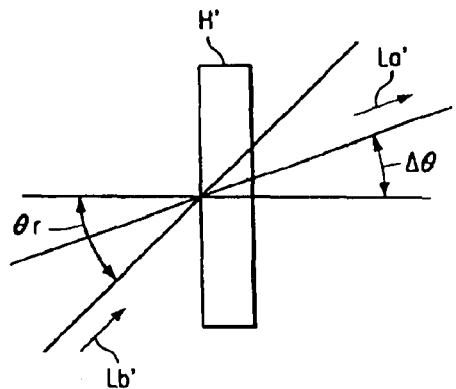
FIG. 6(B) is a schematic diagram of a relationship between regenerated light and a hologram when the hologram is regenerated.

Wavelength selectability is described in detail below. FIG. 6(A) shows the relationship between the preparation light (La, Lb) and the photosensitive material (H) when the hologram is recorded, and FIG. 6(B) shows the relationship between the regenerated light (La',Lb') and the hologram (H') when the hologram is regenerated. La represents the object light (wavelength $\lambda_0$), Lb represents the reference light (wavelength $\lambda_0$), La' represents the regenerated object light, and Lb' represents the regenerated reference light (wavelength $\lambda_c$). Consider the hologram (H') when the object light (La) enters perpendicularly to the photosensitive material (H).

The regenerated light intensity, when the regenerated light wavelength ($\lambda_c$) shifts from the recorded wavelength ($\lambda_0$), exhibits a behavior similar to that of angular selectivity. The spread of the intensity ($\Delta\lambda$) from the maximum wavelength ($\lambda_0$) to the wavelength initially at 0, and the angular change ($\Delta\theta$) in conjunction therewith, can be approximately expressed by equations (1) and (2) below:

$$\Delta\lambda = \frac{dz \cdot \lambda 0}{T} = \frac{\lambda_0^2}{T\left(n \pm \sqrt{n^2 - \sin^2\theta r}\right)} \quad (1)$$

$$\Delta\theta = \sin\theta r \times \frac{\Delta\lambda}{\lambda 0} \quad (2)$$

wherein:

$\theta r$ represents the incidence angle of the reference light (Lb);

n represents the refractive index of the photosensitive material (H);

$\lambda_0$ represents the recorded wavelength;

dz represents the distance of the interference fringes in the thickness direction of the photosensitive material; and T represents the thickness of the photosensitive material (H).

The wavelength selectivity improves as the $\Delta\lambda$ becomes smaller. Accordingly, considering equations (1) and (2), the wavelength selectivity improves as:

(a) the photosensitive material (hologram) is thicker (T is greater);

(b) dz is smaller ($\theta r$ is larger);

(c) refractive index (n) of the photosensitive material is larger; and (d) the recorded wavelength ($\lambda_0$) is shorter.

Figure 7:
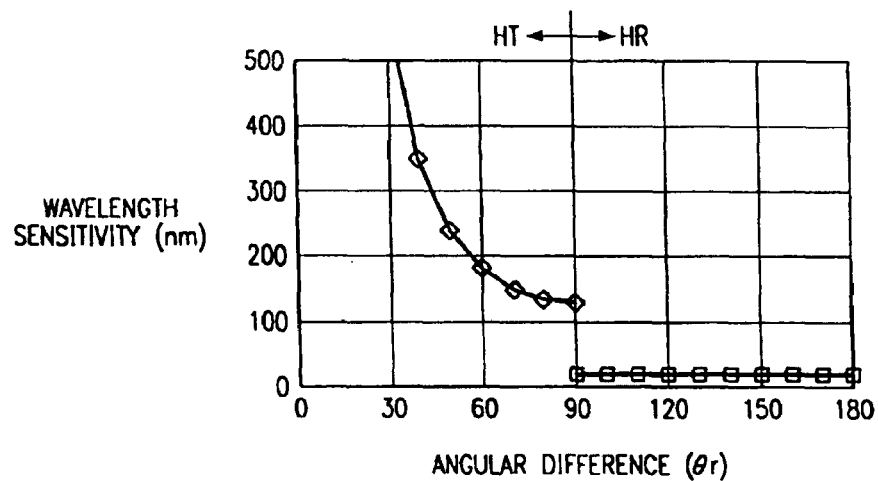
FIG. 7 is a graphical representation of the hologram wavelength selectivity relative to the dual light flux angular difference.

FIG. 7 shows the wavelength selectivity (wavelength spread $\Delta\lambda$) of a reflective type hologram (HR) and a transmission type hologram (HT) relative to the angular difference ($\theta r$) of two light fluxes when the photosensitive material has a refractive index n=1.5, the generated wavelength $\lambda_0$=500 nm, and the photosensitive material thickness T=5 $\mu$m. It can be understood that when the angular difference $\theta r$ between two light fluxes exceeds 90° (in the case of the reflective type hologram (HR)), the wavelength selectivity is rather higher than that of a transmission type hologram (HT).

Although light corresponding to high order diffracted light is regenerated by a plane type hologram (i.e., a so-called thin type hologram), only single order light is regenerated by a volume type hologram (i.e., the so-called thick type hologram). Accordingly, a volume type hologram capable of producing high diffraction efficiency is desirable as a hologram combiner (HC). In an amplitude type hologram, the regenerated illumination light is absorbed as it passes through the hologram, but light is not absorbed by a phase type hologram. Accordingly, a phase type hologram capable of producing a bright information display image is desirable as a hologram combiner (HC). Since the reflective type hologram has a greater angular selectivity than a transmission type hologram, in the case of a volume type hologram, the use of a volume type/reflective type hologram is advantageous in that it provides greater freedom in arrangement of the hologram combiner (HC). For the above-stated reasons, a volume type/phase type/reflective type hologram is used as the hologram combiner (HC) in the present embodiment.

As previously stated, the hologram combiner (HC) has optical power for constructing a surface which is optically equivalent to the image (I1) but at a different position than the image (I1) when viewed from the pupil (EP). This optical power includes optical power to deflect the information display light from the display surface (IM) to the eyepiece system (LE), and optical power, such as that of a positive lens, to move the position of the display surface (IM) to the pentagonal prism (PD). The surface which is optically equivalent to the image (I1) is arranged nearer to the image (I1) via the optical power to deflect the information display light and is arranged at the endface position of the pentagonal prism (PD) via the positive lens-like power. As previously mentioned, optional display patterns are displayable via the arrangement of the display surface (IM) of the display element (DD) at the equivalent surface.

The information display image and the image can be at different enlargement ratios (i.e., focal lengths) relative to an observer via the lens-like optical power of the hologram combiner (HC). In this way the size of the information display image, and the size of the display surface (IM) can be reduced. Furthermore, the position of the display surface (IM) can be arranged at a suitable surface of the pentagonal prism (PD) since the display element (DD) can be freely arranged. When the hologram combiner (HC) does not possess a lens-like optical power, a large size display element (DD) of the display surface (IM) must be arranged at a position separated from the pentagonal prism (PD), thereby enlarging the overall scale of the viewfinder optical system. As previously mentioned, providing the hologram combiner (HC) with a lens-like optical power produces a wide display area and a compact structure.

In regard to the arrangement of the hologram combiner (HC), it is desirable that the hologram combiner (HC) is arranged on the object side (i.e., the front) of the eyepiece system (LE) as in the present embodiment. When the hologram combiner (HC) is arranged on the object side of the eyepiece system (LE), the information display image and the image (image (I1)) are aligned and enlarged for viewing via the eyepiece system (LE), thereby reducing the total focal length of the information display system. Accordingly, the display surface (IM) can be smaller, so as to provide a more compact viewfinder optical system. Furthermore, since the lens-like optical power required by the hologram combiner (HC) can be reduced, there is an advantageous reduction of degradation due to aberration in the information display system. As a result, an excellent, high-resolution information display image is obtained.

The hologram combiner (HC) is a phase type hologram generated by a dual flux interference recording, and one of the preparation lights (object light or reference light) is desirably produced by an optical system identical to the eyepiece system (LE). The hologram combiner (HC) produces the highest diffraction efficiency when prepared by a light flux identical to that during actual use of the hologram, so as to produce an information display image which is bright around the edges. The use of such light flux is a condition for producing the best aberration correction by the hologram. Accordingly, the use of a hologram combiner (HC) of the aforesaid construction provides a bright and highly detailed information display.

In viewfinder optical systems of the Keplerian type (real image type) wherein the image (I1) is a real image as in the present embodiment, an inverting system must be used to invert the image so as to view the object image as an erect positive image. The pentagonal prism (PD) forms this inverting system. The hologram combiner (HC) is arranged within the pentagonal prism (PD). Placement of the hologram combiner (HC) within the inverting system is desirable from the perspective of providing a compact and highly efficient hologram combiner (HC).

When the inverting system is formed by the block of the pentagonal prism (PD) having a plurality of endfaces, as in the present embodiment, and the hologram combiner (HC) is arranged on an endface of the block (i.e., the endface of the inverting system), it is unnecessary to provide a separate space for the hologram combiner (HC). In this way the structure is compact and highly efficient. When the hologram combiner (HC) is provided on the endface of the block, the information display light is inverted by the hologram combiner (HC) and joins the object light, such that the information display light must be reflected in an internal direction of the block. In this way the information display light from other endfaces of the block are directed toward the interior of the block. Since the inverting system includes a penta-roof structure in the present embodiment, the hologram combiner (HC) is arranged on the final reflective surface (SR) such that the information display light enters from a gap between the roof reflective surface (SD) and the exit surface (S2). This arrangement is efficient in the viewfinder optical system of the penta-roof type used in single lens reflex cameras.

Figure 2:
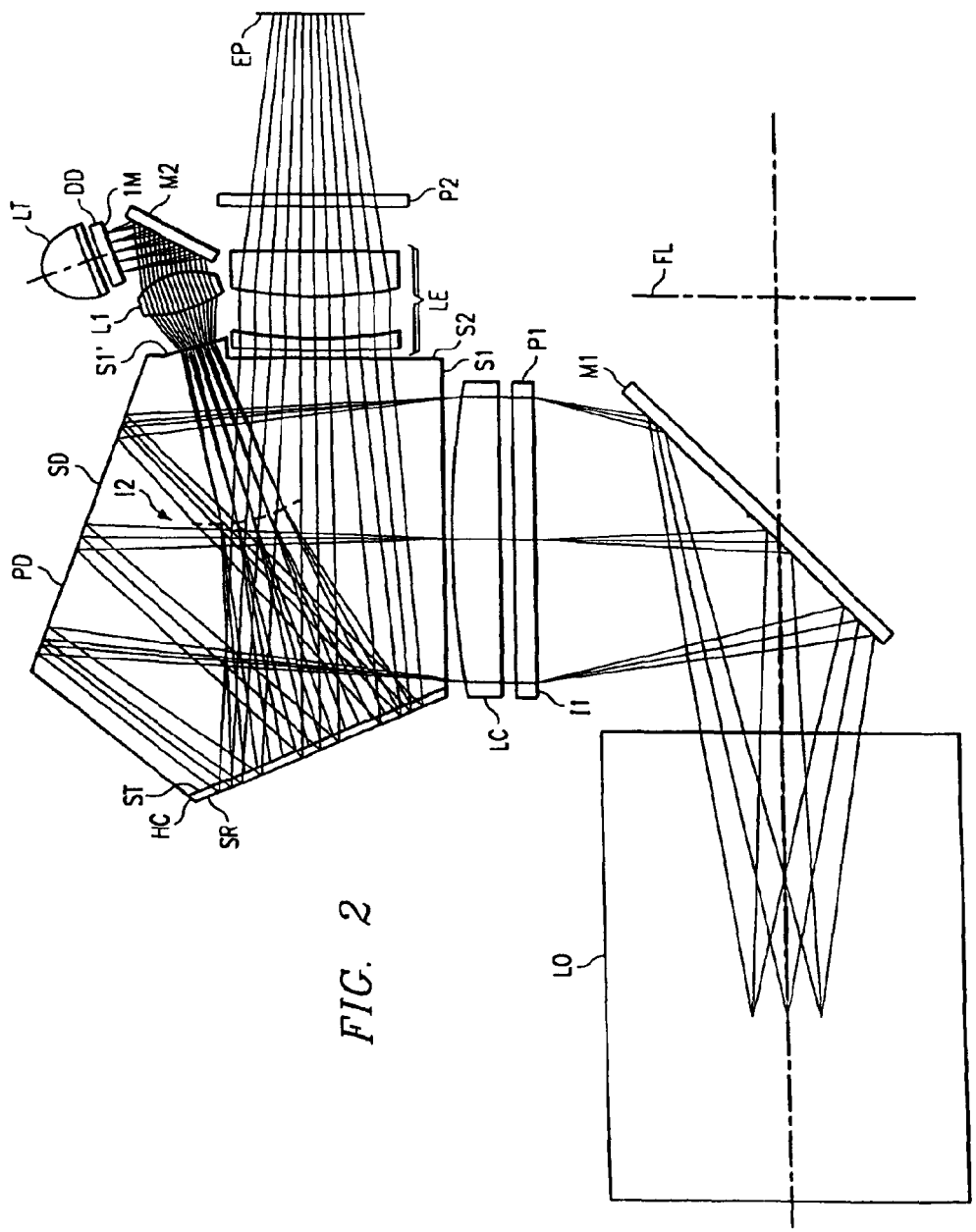
FIG. 2 is an optical structural diagram of a second embodiment of the present invention.

FIG. 2 shows the optical structure of a second embodiment of the present invention. An aspect of the second embodiment is that the information display system is incorporated within the image re-forming system, and the second embodiment is in other aspects identical to the first embodiment. The image re-forming system is arranged between the display surface (IM) and the hologram combiner (HC), and comprises a mirror (M2), an image forming lens (L1), and an incidence surface (S1') forming a lens surface.

From the perspective of the brightness of the information display, it is desirable that the entrance of the information display light to the pentagonal prism (PD) is accomplished from an optical surface not used in the optical path of the object light (i.e., an optical surface at a gap in the optical path of the object light). For this reason the entering flux of the information display light must be reduced as much as possible. In the present embodiment, the display element (DD) is arranged such that the image forming surface (I2) re-forms an image at the display surface (IM) position via the image re-forming system, and an approximately conjugate correspondence is set between the incidence surface (S1') and the pupil (EP) from the image re-forming system so as to match the pupil of the information display light at the incidence surface (S1') via the hologram combiner (HC). Since the pupil of the information display light matches the incidence surface (S1'), the incidence flux of the information display light is reduced at the incidence surface (S1') position. Since the image forming magnification of the image re-forming system can be freely set, enlargement of the display area can be achieved, so as to provide a wider display area than with the first embodiment. Since the display element (DD) is also reduced in size, a compact viewfinder construction can be realized.

Figure 3:
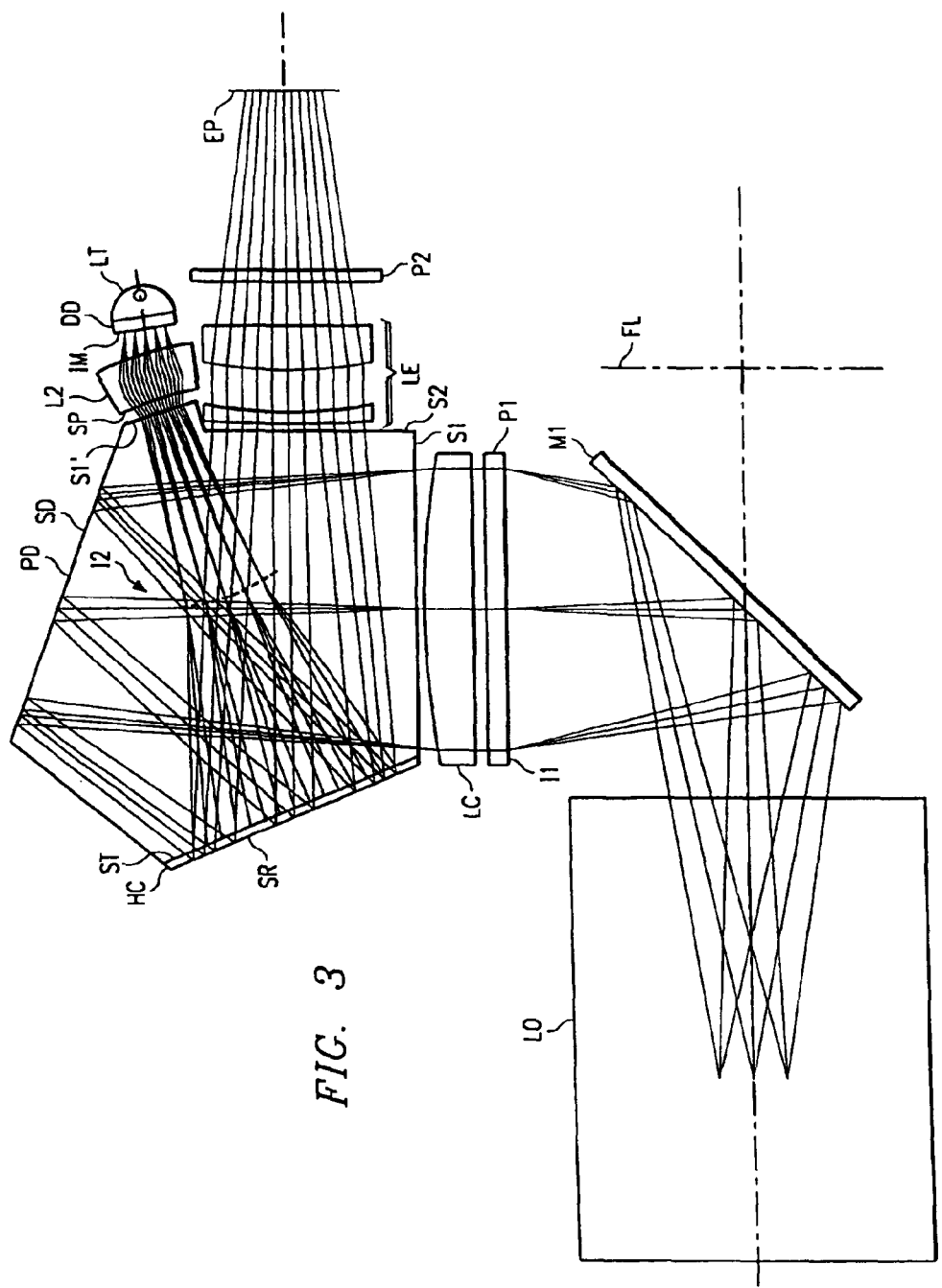
FIG. 3 is an optical structural diagram of a third embodiment of the present invention.

FIG. 3 shows the optical structure of a third embodiment of the present invention. An aspect of the third embodiment is that the image re-forming system comprises a pancake type image forming lens (L2) which is incorporated into the information display system. In other aspects, the third embodiment is identical to the second embodiment, and the effectiveness of the image re-forming lens is similar to that of the second embodiment. The image forming lens (L2) has a selective reflective surface (SP) on the pentagonal prism (PD) side and uses a cholesteric liquid crystal panel and/or the like for the selective reflective surface (SP). The image forming lens (L2) has a concave reflective surface so as to improve the aberration performance of the information display light and allow high resolution viewing as compared to the first embodiment.

Figure 4:
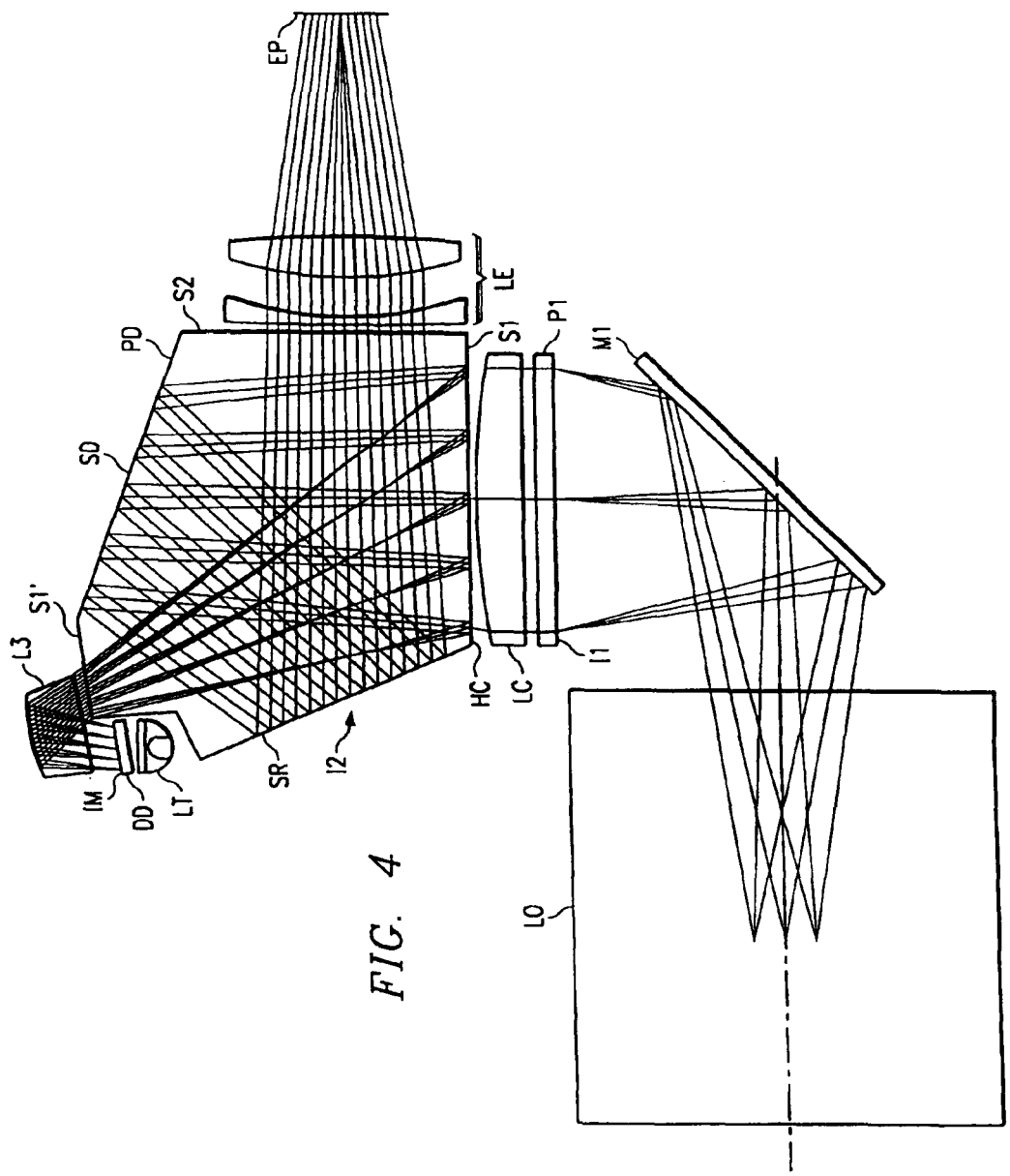
FIG. 4 is an optical structural diagram of a fourth embodiment of the present invention.

FIG. 4 shows the optical structure of a fourth embodiment of the present invention. Aspects of the fourth embodiment are that the hologram combiner (HC) is arranged on the object light incidence surface (S1) of the pentagonal prism (PD), and the image-reforming system, comprising an image forming prism (L3), is incorporated into the information display system. In other aspects the fourth embodiment is similar to the first embodiment and achieves an effectiveness similar to the second embodiment.

In this embodiment, the display element (DD) is arranged so as to re-form the image forming surface (I2) at the display surface (IM) via the image forming prism (L3), and an approximately conjugate correspondence is set between the incidence surface (S1') and the pupil (EP) by the image forming prism (L3) so as to match the pupil of the information display light at the incidence surface (S1') via the hologram combiner (HC). Since the inverting system is incorporated in the penta-roof structure, the hologram combiner (HC) is arranged on the incidence surface (S1) of the object light, and the information display light enters through a gap between the roof reflective surface (SD) and the final reflective surface (SR). This arrangement is efficient in the viewfinder optical system of the penta-roof type used in single lens reflex cameras.

Figure 5:
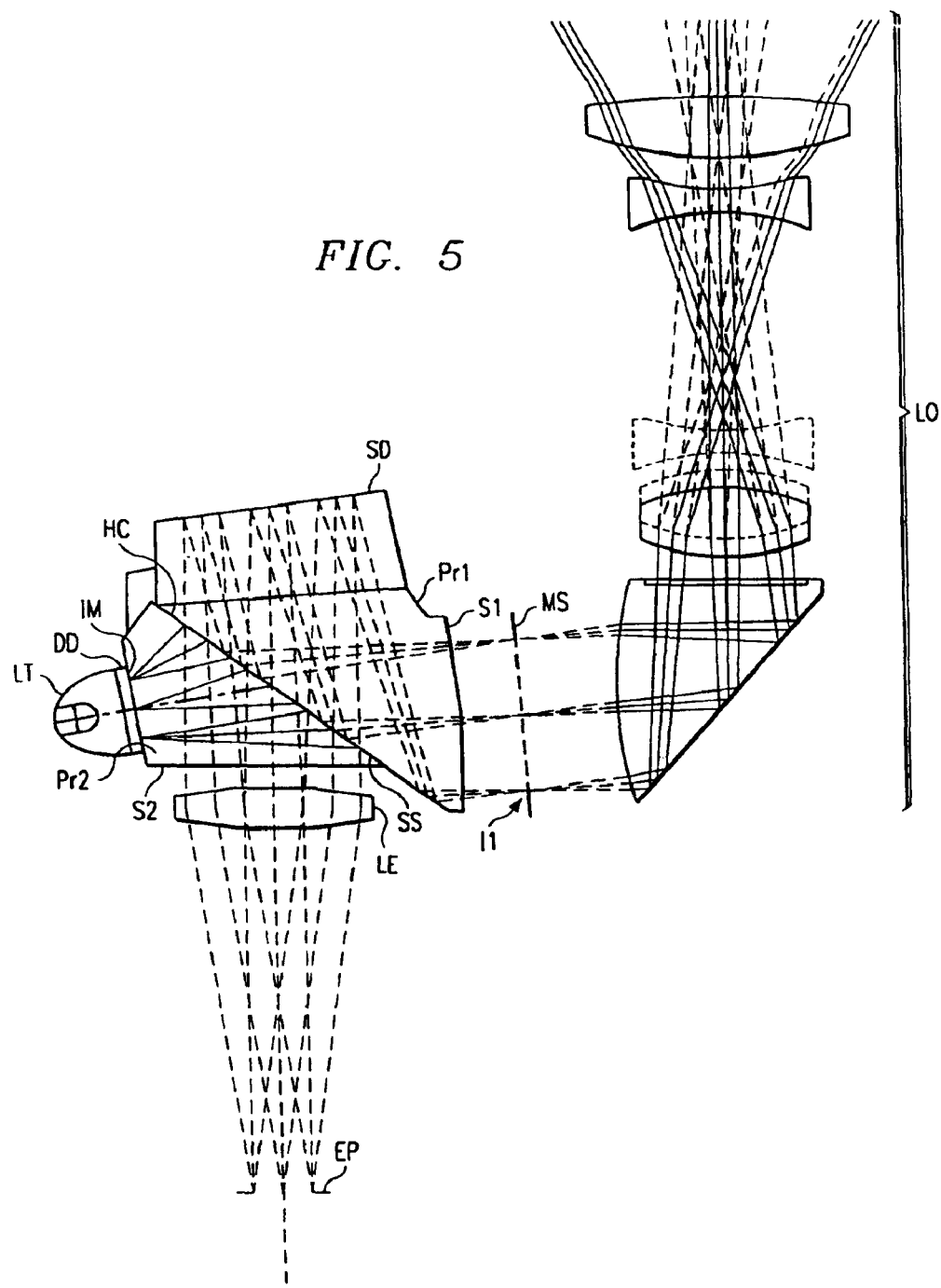
FIG. 5 is an optical structural diagram of a fifth embodiment of the present invention.
Figure 11:
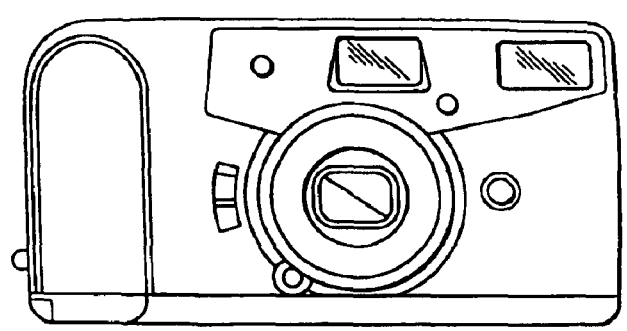
FIG. 11 is a front view of a compact camera.

FIG. 5 shows the optical structure of a fifth embodiment of the present invention. The fifth embodiment is provided with an objective system (LO) for forming an image (I1) and an eyepiece system (LE) for enlarging and directing the image (I1) to the pupil (EP). This embodiment is a viewfinder optical system of the separate real image type for lens shutter cameras, such as that shown in FIG. 11. This viewfinder optical system includes the construction of a typical viewfinder optical system of an objective system (LO), field frame (MS), first prism (Pr1), second prism (Pr2), eyepiece system (LE), and further comprises an information display system having an illumination light source (LT), display element (DD), and hologram combiner (HC).

The inverting system of the present embodiment comprises a first prism (Pr1) having a roof reflective surface (SD), and a second prism (Pr2) arranged with a small space between the first prism (Pr1). The gap between the first prism (Pr1) and the second prism (Pr2) forms the TIR surface (SS) of total reflection and transmission, and directs the object light to the pupil (EP). A hologram combiner (HC) is provided on the second prism (Pr2) side of the TIR surface (SS), such that the object light passes through the hologram combiner (HC), and the information display light from the display surface (IM) is reflected by the hologram combiner (HC). The light transmitted by the hologram combiner (HC) (i.e., the object light) and the light reflected by the hologram combiner (HC) (i.e., the information display light) are both directed toward the eyepiece system (LE), such that the image formed by the transmitted light and the information display image formed by the reflected light are projected as virtual images at the same position by the eyepiece system (LE). That is, the information display is overlaid on the image (I1) and viewed together with the photographic image in the field of the viewfinder.

In the case of a real image type viewfinder, a target mark such as an AF frame is arranged at the position of the image (I1), but to achieve this arrangement, a physical surface is required at the position of the image (I1). If foreign matter, such as dust, dirt, etc., adheres to this physical surface, the foreign matter is also enlarged together with the image (I1) by the eyepiece system (LE) and the overlaid matter is visible in the field of view, thereby reducing quality. In the viewfinder optical system of the present embodiment, a physical surface is not required at the image (I1) since the information display of the target mark and the like is accomplished by the hologram combiner (HC). Accordingly, foreign matter is not visible in the clear field of view.

Figure 8:
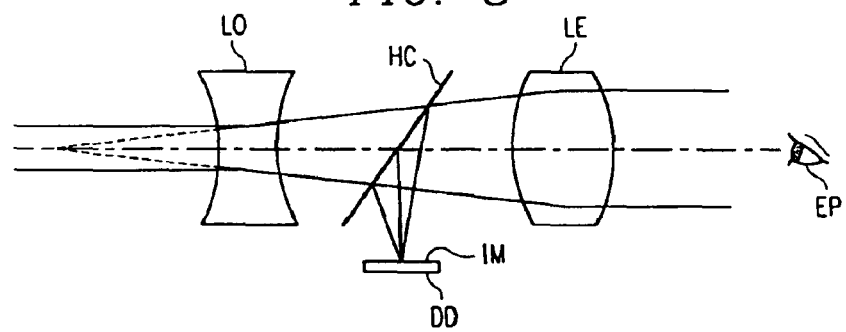
FIG. 8 is an optical structural diagram of an embodiment of a reverse Galileo type viewfinder optical system.
Figure 9:
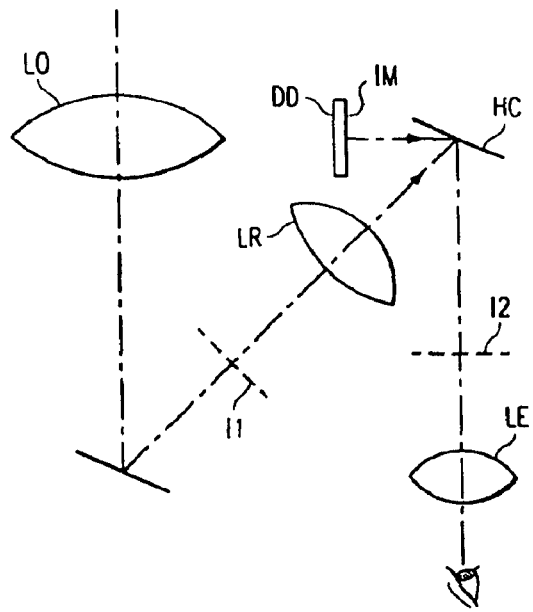
FIG. 9 is an optical structural diagram of an embodiment of a relay type viewfinder optical system.

The constructions using the hologram combiner (HC) as in the previously described embodiments are not limited to real image type viewfinder optical systems, inasmuch as these constructions are applicable to virtual image type viewfinder optical systems, such as the reverse Galileo type system shown in FIG. 8, and are applicable to relay type viewfinder optical systems using a relay lens (LR) as an inverting system as shown in FIG. 9. In the relay type viewfinder construction shown in FIG. 9, a secondary image of the image (I1) and the information display image of the display surface (IM) are overlaid at a position of the image forming surface (I2). The constructions using the hologram combiner (HC) are not limited to the viewfinder optical systems of cameras, inasmuch as these constructions are applicable to viewing optical systems of binoculars, microscopes and the like. Although the inverting systems are formed using prisms in the previously described first through fifth embodiments, it is to be noted that the inverting system may be constructed by combining surface reflecting members such as a hollow penta mirror. In this instance, if a hologram combiner (HC) is adhered to the surface of a plane mirror, a effectiveness is obtained similar to that of the previously described embodiments.

As described above, the present invention realizes a viewing optical system capable of displaying optional information using a hologram.

Although the present invention has been fully described by way of examples with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. A viewing optical system comprising:
   an objective system for forming on an image surface an image of an object;
   an eyepiece system for enlarging and directing the image to a pupil;
   a hologram combiner having an optical power for constructing an equivalent surface which is optically equivalent to the image surface at a different position than the image surface as viewed from the pupil;
   an information display device for displaying information on the surface;
   a mirror for reflecting the image formed by the objective system;
   a focusing screen;
   a condenser lens; and
   a pentagonal prism for inverting the image, said pentagonal prism having a plurality of surfaces, said hologram combiner being disposed on one of said plurality of surfaces,
   wherein the hologram combiner transmits light from the image and reflects light from the information display device so that the image can be viewed with the information overlaid thereon.

2. A viewing optical system, as claimed claim 1, wherein said information display device comprises an illumination light source and a display element, said display element being for modulating light from the illumination light source so as to display information on the equivalent surface.

3. A viewing optical system, as claimed in claim 1, wherein said information display device comprises:
   an illumination light source;
   a display element, said display element being for modulating light from the illumination light source so as to display information on the equivalent surface;
   an image reforming mirror;
   an image forming lens; and
   an incidence surface,
   wherein said display element modulates light from the illumination light source so as to display information, said image reforming mirror reflects the information, displayed by the display element, toward the image forming lens, and said image forming lens transmits the thus reflected information to the equivalent surface.

4. A viewing optical system, as claimed in claim 1, said information display device comprising:
   an illumination light source;
   a display element; and
   an image forming lens having a selective reflective surface,
   wherein said display element modulates light from the illumination light source so as to display information and said image forming lens transmits the thus displayed information to the equivalent surface.

5. A viewing optical system, as claimed in claim 1, wherein said information display device comprises:
   an illumination light source;
   a display element; and
   an image forming prism,
   wherein said display element modulates light from the illumination light source so as to display information and the image forming prism transmits the thus displayed information to the equivalent surface.

6. An optical apparatus comprising a viewing optical system, said viewing optical system comprising:
   an objective system for forming on an image surface an image of an object;
   an eyepiece system for enlarging and directing the image to a pupil;
   a hologram combiner having an optical power for constructing an equivalent surface which is optically equivalent to the image surface at a different position than the image surface as viewed from the pupil;
   an information display device for displaying information on the equivalent surface;
   a mirror for reflecting the image formed by the objective system;
   a focusing screen;
   a condenser lens; and
   a pentagonal prism for inverting the image, said pentagonal prism having a plurality of surfaces, said hologram combiner being disposed on one of said plurality of surfaces,
   wherein the hologram combiner transmits light from the image and reflects light from the information display device so that the image can be viewed with the information overlaid thereon.

7. An optical apparatus, as claimed in claim 6, wherein said information display device comprises an illumination light source and a display element, said display element being for modulating light from the illumination light source so as to display information on the equivalent surface.

8. An optical apparatus, as claimed in claim 6, wherein said information display device comprises:
   an illumination light source;
   a display element, said display element being for modulating light from the illumination light source so as to display information on the equivalent surface;
   an image reforming mirror;
   an image forming lens; and
   an incidence surface,
   wherein said display element modulates light from the illumination light source so as to display information, said image reforming mirror reflects the information, displayed by the display surface, toward the image forming lens, and said image forming lens transmits the thus reflected information to the equivalent surface.

9. An optical apparatus, as claimed in claim 6, said information display device comprising:
   an illumination light source;
   a display element; and
   an image forming lens having a selective reflective surface,
   wherein said display element modulates light from the illumination light source so as to display information and said image forming lens transmits the thus displayed information to the equivalent surface.

10. An optical apparatus, as claimed in claim 6, wherein said information display device comprises:

an illumination light source;

a display element; and an image forming prism, wherein said display element modulates light from the illumination light source so as to display information and the image forming prism transmits the thus displayed information to the equivalent surface.

11. A viewing optical comprising:

an objective system for forming on an image surface an image of an object;

an eyepiece system for enlarging and directing the image to a pupil;

a hologram combiner having an optical power for constructing an equivalent surface which is optically equivalent to the image surface at a different position than the image surface as viewed from the pupil;

an information display device for displaying information on the equivalent surface;

a field frame; and an inverting system comprising a first prism and a second prism arranged with a small space therebetween, the small space forming a TIR surface, the hologram combiner being disposed on a second prism side of the TIR surface, wherein the objective system comprises a plurality of lenses and a prism, and wherein the hologram combiner transmits light from the image and reflects light from the information display device so that the image can be viewed with the information overlaid thereon.

12. An optical apparatus comprising a viewing optical system, said viewing optical system comprising:

an objective system for forming on an image surface an image of an object;

an eyepiece system for enlarging and directing the image to a pupil;

a hologram combiner having an optical power for constructing an equivalent surface which is optically equivalent to the image surface at a different position than the image surface as viewed from the pupil;

an information display device for displaying information on the equivalent surface;

a field frame; and an inverting system comprising a first prism and a second prism arranged with a small space therebetween, the small space forming a TIR surface, the hologram combiner being disposed on a second prism side of the TIR surface, wherein the objective system comprises a plurality of lenses and a prism, and wherein the hologram combiner transmits light from the image and reflects light from the information display device so that the image can be viewed with the information overlaid thereon.

* * * * *

UNITED STATES PATENT AND TRADEMARK OFFICE
CERTIFICATE OF CORRECTION

PATENT NO. : 6,914,726 B2
DATED : July 5, 2005
INVENTOR(S) : Ichiro Kasai

It is certified that error appears in the above-identified patent and that said Letters Patent is hereby corrected as shown below:

Column 9,
Line 23, delete "on the surface;" and insert -- on the equivalent surface; --.

Signed and Sealed this

Sixth Day of September, 2005

JON W. DUDAS
*Director of the United States Patent and Trademark Office*